UNITED STATES PATENT OFFICE.

JOHN F. CAVARLY, OF FLUSHING, NEW YORK.

IMPROVEMENT IN PURIFYING ACETIC ACID.

Specification forming part of Letters Patent No. 121,586, dated December 5, 1871.

*To all whom it may concern:*

Be it known that I, JOHN F. CAVARLY, of Flushing, in the county of Queens and State of New York, have invented a new and useful Improvement in Treating and Deodorizing Acetic Acid; and I do hereby declare the following to be a full, clear, and exact description thereof, which will enable those skilled in the art to make and use the same.

This invention relates to the treatment of acetic acid, and is especially applicable to acetic acids of commerce produced from wood; and it consists in deodorizing and purifying the same by means of any of the compounds known in chemistry as the alcohols.

In carrying out my invention I take any of the compounds known in chemistry as the alcohols, which are included in the formula $C_2nH_2(n+1)O_2$, and mix a small quantity thereof with the acetic acid to be treated, varying the quantity of the alcohol ingredient from about one ounce to about a pound, more or less, to a barrel of forty gallons of acid, according to the grade or quality of the acid to be treated; the more offensive the acid the larger the quantity of the alcohol, say above an ounce being used in the treatment. The mixture of acid and alcohol is then passed through an ordinary vinegar-generator, any of the forms of which can be used for that purpose.

By means of this treatment with such alcoholic compounds I am enabled to cleanse the commercial acetic acid and remove from it those empyreumatic or smoky and tarry tastes and odors which may be present in it, and render it fit for use at a small expense.

I do not wish to restrict myself to any particular quantity of such alcohol to be used in the treatment, nor to any particular form of apparatus, or method of agitation, or of exposure of the mixture to air or gas.

What I claim as new, and desire to secure by Letters Patent, is—

The treatment of acetic acid with any of the compounds known in chemistry as the alcohols, as above stated, substantially as and for the purpose above described.

This specification signed by me this 13th day of November, 1871.

JOHN F. CAVARLY.

Witnesses:
SIMON V. VEDDER,
W. HAUFF. (35)